June 8, 1954  R. W. COOK  2,680,715
CHLORINATOR
Filed March 27, 1950  2 Sheets-Sheet 1
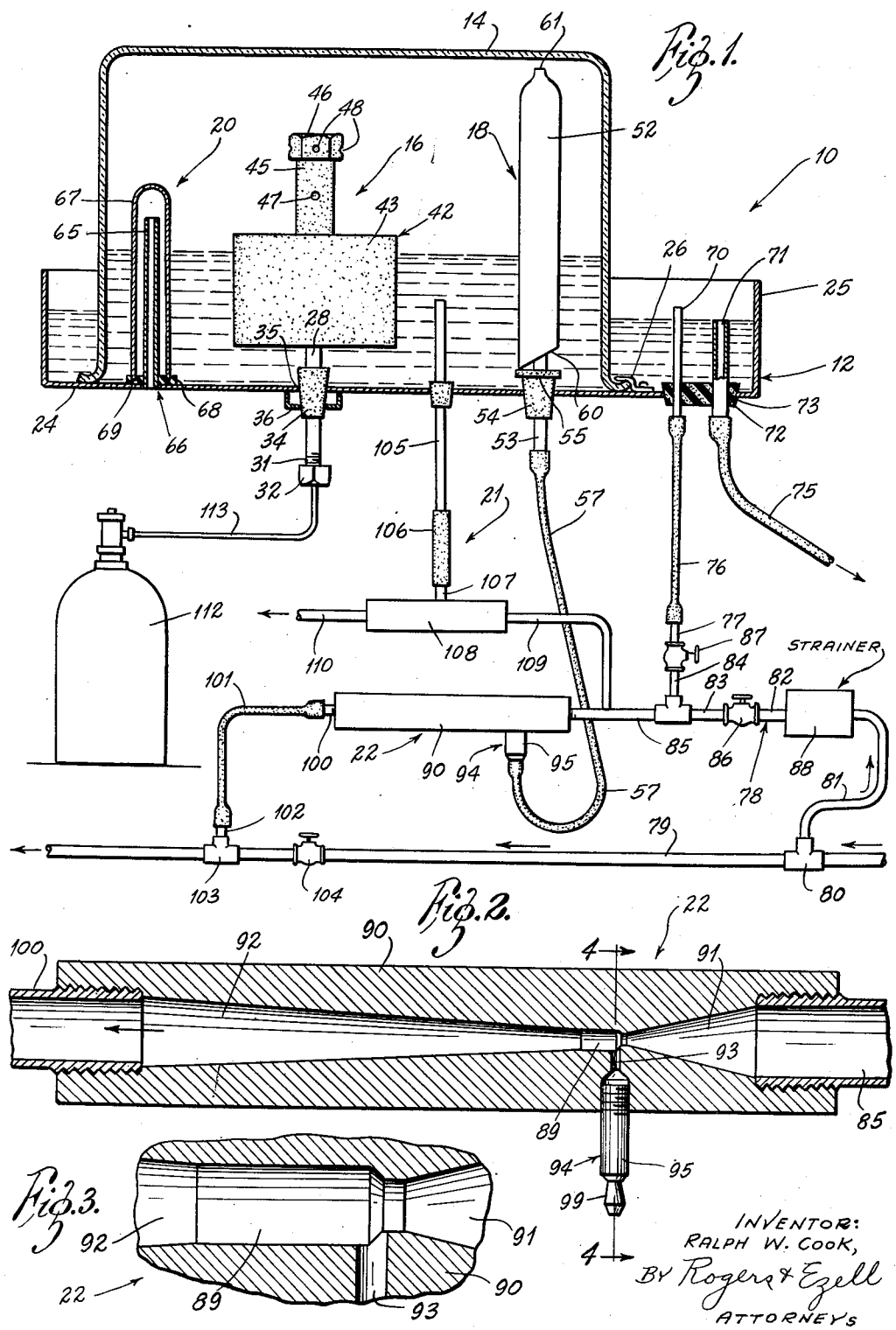
INVENTOR:
RALPH W. COOK,
By Rogers & Ezell
ATTORNEYS June 8, 1954 R. W. COOK 2,680,715
CHLORINATOR
Filed March 27, 1950 2 Sheets-Sheet 2
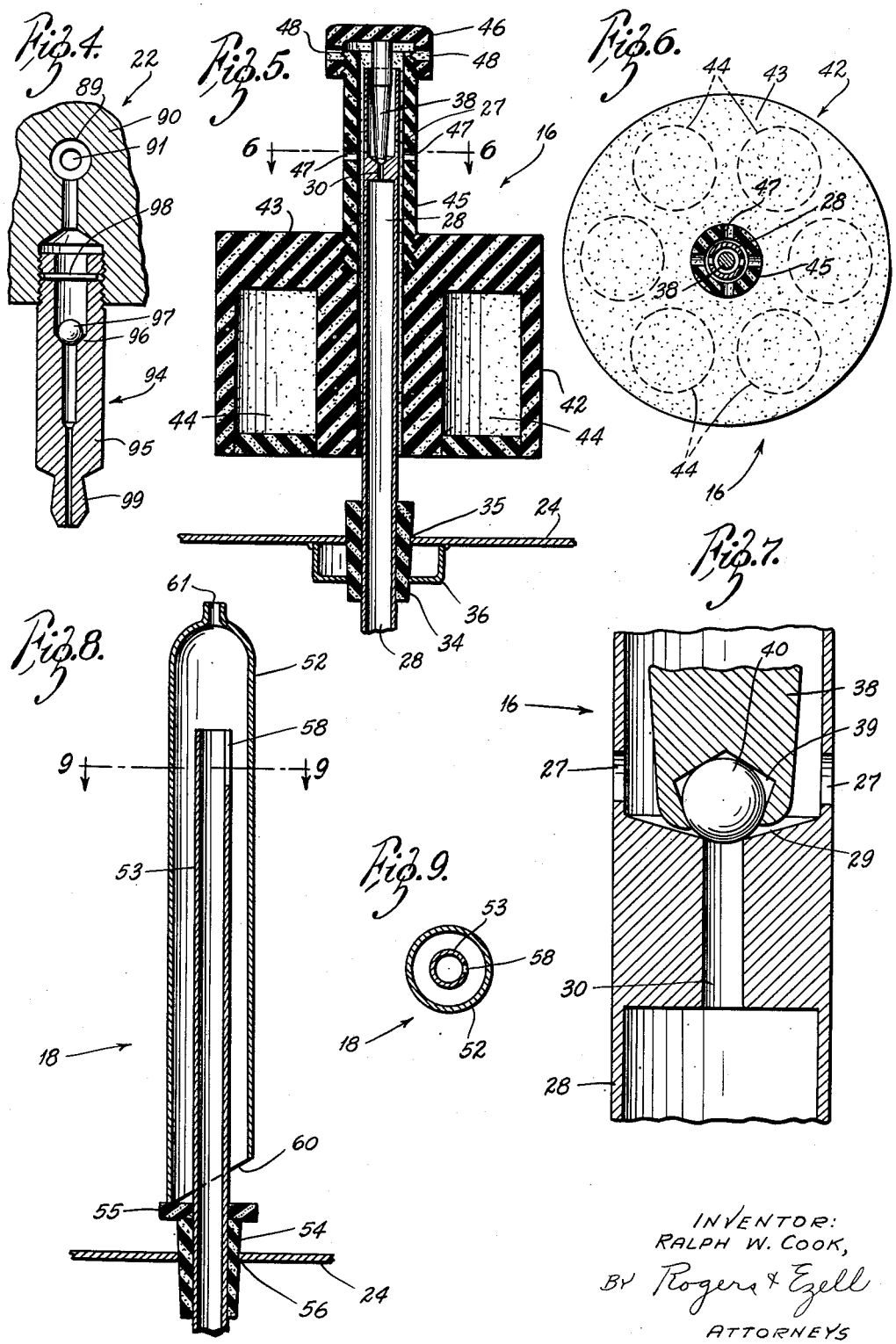
INVENTOR:
RALPH W. COOK,
BY Rogers & Ezell
ATTORNEYS Patented June 8, 1954

2,680,715

UNITED STATES PATENT OFFICE 2,680,715

CHLORINATOR

Ralph W. Cook, Dunedin, Fla., assignor to Clinton Foods Inc., New York, N. Y., a corporation of Delaware Application March 27, 1950, Serial No. 152,254

5 Claims. (Cl. 210—28)

The present invention relates generally to chlorinator constructions, and more particularly to a novel chlorinator by which a predetermined amount of chlorine is automatically supplied to a water line.

In brief, the present chlorinator comprises a resistant tray adapted to hold chlorinated water on which is disposed an inverted glass dome beneath which is tapped a continuous supply of chlorine gas which is to be furnished to a water line. A float valve assembly is provided for introducing chlorine gas beneath the glass dome from a cylinder upon demand, and a chlorine metering orifice tube and a suction tube are provided for removal of the chlorine gas from beneath the glass dome to a point for transfer to the water line. A Venturi tube is connected to the suction tube for drawing the chlorine from beneath the glass dome. A vacuum relief float prevents water from rising too high within the glass dome upon failure of the supply of chlorine gas to eliminate the possibility of the passage of water into the chlorine gas cylinder. A safety device is provided to prevent escape of chlorine into the surrounding atmosphere. Water supply and exhaust means are provided, the latter of which is adjustable in order to secure a satisfactory water working level within the glass dome.

Therefore, an object of the present invention is to provide a novel chlorinator by which chlorine gas is automatically transferred from a chlorine gas cylinder into a water line.

Another object is to provide a novel chlorinator which automatically maintains a supply of chlorine gas within a provided container for vacuum transfer to a water supply.

Another object is to provide a novel chlorinator which accurately supplies chlorine gas to a water line with minimum loss of the gas in the water seal and with substantial elimination of the escaping of chlorine gas into the surrounding atmosphere.

Another object is to provide a novel chlorinator which finds wide adaptation and which may be employed in bank or as a single unit.

Another object is to provide novel chlorine gas supply and exhaust assemblies forming parts of a chlorinator.

Another object is to provide a novel safety device for a chlorinator forming a part thereof which insures against chlorine leaking into the surrounding atmosphere.

Other objects are to provide a novel chlorinator which is simple in construction, which has relatively few moving parts, which reduces to a minimum elements which may be attacked by the corrosive effect of chlorine gas, thereby reducing maintenance to a minimum and insuring long operation of the present construction without impaired efficiency or actual breakdown, which may be readily dismantled for the occasional repair or replacement of any of the elements, which is inexpensive to construct and to maintain, and which otherwise fulfills the objects and advantages sought therefor.

The foregoing and other objects and advantages are apparent from the following description taken with the accompanying drawings, in which:

Fig. 1 is a flow diagram, particular elements and members being shown in vertical cross section, illustrating a chlorinator incorporating the teachings of the present invention;

Fig. 2 is an enlarged vertical longitudinal cross-sectional view through the Venturi tube;

Fig. 3 is a further enlarged fragmentary view of the throat of the Venturi tube;

Fig. 4 is a further enlarged vertical transverse cross-sectional view on substantially the line 4—4 of Fig. 2;

Fig. 5 is an enlarged vertical diametric cross-sectional view through the float valve assembly;

Fig. 6 is a horizontal cross-sectional view on substantially the line 6—6 of Fig. 5;

Fig. 7 is a further enlarged fragmentary view of the lower end of the float valve pin and retained sapphire ball slightly raised from the seat in the valve staff;

Fig. 8 is an enlarged vertical diametric cross-sectional view through the chlorine gas metering orifice tube and suction tube; and Fig. 9 is a horizontal cross-sectional view on substantially the line 9—9 of Fig. 8.

Referring to the drawings more particularly by reference numerals, 10 indicates generally a chlorinator constructed in accordance with the teachings of the present invention. Broadly, the chlorinator 10 includes a water receptacle or tray 12, a glass dome 14, a float valve assembly 16, a chlorine discharge assembly 18, a vacuum relief unit 20, a chlorine escape prevention unit 21, a Venturi tube unit 22, a water supply and discharge means, shut-off valves, and suitable interconnecting tubing for chlorine gas and water lines for water.

More specifically considering the several elements and assemblies, the water receptacle 12 has a flat bottom 24, a vertical continuous wall 25, and is of material resistant to attack by chlorine. Numerous openings are provided in the bottom 24 as is pointed out below. A cabinet or stand may be provided to support the receptacle 12 and house certain parts.

The glass dome 14 may be a Pyrex beaker, one of four liter capacity being adequate both for depth and diameter in one installation. Three spring clips 26 releasably maintain the glass dome 14 in position, the clips 26 being riveted or otherwise secured to the bottom 24. Other securing means may be employed.

The float valve assembly 16 is beneath the dome 14 and includes an elongated hollow valve staff 28 of tantalum or other material resistant to corrosion by chlorine gas (Figs. 1, 5, and 7). Near its upper end the valve staff 28 has an internal valve seat 29 formed at one end of a short reduced passage 30. Annularly spaced apertures 27 are formed in the valve staff 28 adjacent the seat 29 for the escape of chlorine gas. External threads 31 are formed on the lower end of the valve staff 28 which receive a suitable connector 32 (Fig. 1). The valve staff 28 is mounted in a vertical position in a rubber stopper 34 of frusto-conical form which is wedged into an opening 35 in the bottom 24 and which is braced by a suitable member 36 welded to the lower surface of the bottom 24 (Fig. 5). A wooden block wedged into a tube segment welded to the lower surface of the bottom 24 has also been found effective for supporting the valve staff 28.

A valve pin 38 is mounted in the upper end of the valve staff 28 and extends a short distance vertically therefrom. At its lower end, the pin 38 is formed with an opening 39 which receives a clear sapphire ball valve 40 which seats on the valve seat 29 (Fig. 7). The pin 38 is of tantalum or other material resistant to corrosion by chlorine gas. It is to be noted that machining of the valve seat 29 accurately enough to prevent leakage of chlorine gas is for practical purposes impossible, and, therefore, the effective valve seat 29 is formed by inserting the valve pin 38 with its sapphire ball valve 40 into the valve staff 28 and then tapping the upper end of the pin 38 lightly.

A float unit 42 maintains the ball valve 40 in closed relation with the seat 29 when there is no demand for chlorine gas. The float unit 42 includes a buoyant float element 43 having air chambers 44 which is suspended from the lower end of a sleeve 45 by suitable threads. A cap element 46 threadedly engages the upper end of the sleeve 45, and is adapted to contact the upper end of the valve pin 38 at all times when the water level within the glass dome 14 is below a predetermined height. The sleeve 45 includes chlorine gas discharge openings 47 adjacent the apertures 27, and the cap element 46 has spaced radial chlorine gas discharge openings 48.

The chlorine discharge assembly 18 is also disposed beneath the glass dome 14, and includes an outer chlorine metering orifice tube 52 and an inner suction tube 53, both of which may be formed from Pyrex tubing (Figs. 1, 8 and 9). In one operating installation, the tube 52 is substantially nine inches long and fifteen mm. O. D. and the tube 53 is substantially eleven inches long and seven mm. O. D. The tube 53 is mounted in a tapered rubber stopper 54 topped by a rubber washer 55, the stopper 54 being snugly mounted in an opening 56 formed in the bottom 24 of the receptacle 12. One end of a tube 57 of rubber, plastic, or other suitable material is secured to the lower end of the tube 53 below the receptacle 12. A slot 58 is formed in the upper end of the tube 53 which, in the particular tube 53 mentioned, is ⅛" x ⅝". The lower end of the tube 52 is cut on the bias at 60 to permit water to enter, the lowermost sharp end thereof resting against the rubber washer 55 for support of the tube 52. A small orifice 61 is formed at the upper end of the tube 52, the size being determined by the particular installation. The tube 53 is vertically adjustable in the rubber stopper 54 for regulation and adjustment of the chlorine gas feed rate under normal operations, large changes in the feed rate being obtained by changing the size of the orifice 61 which may be readily accomplished by substituting another tube 52 with the proper size orifice for the specific installation.

The vacuum relief float unit 20 is likewise disposed beneath the glass dome 14, and includes an interior tube 65 of chlorine resistant material in communication with the outside atmosphere mounted in a suitable opening 66 in the bottom 24 of the receptacle 12, and an inverted Pyrex lipless test tube 67 which rests freely on a rubber washer 68 disposed about the tube 65 at its lower end. The rubber washer has a groove 69 in it to allow water to pass freely between it and the bottom edge of the tube 67.

Exteriorly of the glass dome 14 are a water inlet tube 70 and a water overflow or outlet tube 71 which are mounted in a rubber stopper 72 of frusto-conical form wedged in an opening 73 formed in the bottom 24 of the receptacle 12 (Fig. 1). The upper end of the tube 70 is a little higher than the upper end of the outlet tube 71. A discharge rubber hose 75 is connected to the lower end of the outlet tube 71, the free end of which may be disposed in a sump or other suitable place (not shown). A rubber tube 76 is connected to the lower end of the water inlet tube 70, the other end of which is connected to a pipe segment 77. An auxiliary water line 78 supplies water to the water inlet tube 70, being tapped into a main water line 79 by a T connector 80, and includes pipe segments 81, 82, 83, 84, and 85, and valves 86 and 87. A strainer 88 is also provided in the auxiliary water line 78.

The Venturi tube unit 22 includes a Venturi tube 90 of cylindrical exterior form, to one end of which is threadedly connected the pipe segment 85 (Figs. 1, 2, and 3). Interiorly, the Venturi tube 90 is formed as is clearly illustrated in Figs. 2 and 3, including a short entrance passage 91 of frusto-conical form and a long discharge passage 92 of frusto-conical form. At the juncture of the passages 91 and 92 is a cylindrical throat 89 from the entry end of which extends a radial passage 93 which is enlarged at its outer end and threadedly receives a check valve 94. As is clear from Figs. 2 and 4, the check valve 94 includes an elongated casing 95 having a valve seat 96 formed interiorly thereof and housing a glass ball valve 97 which seats thereon. A pin 98 preferably of tantalum prevents accidental loss or dislodgment of the ball valve 97. The passageway of the check valve 94 is preferably as illustrated to provide an adequate suction effect. The lower end of the tube 57 is connected to a nipple portion 99 of the check valve 94. At its discharge end, the Venturi tube 90 threadedly receives a pipe segment 100 of corrosion resistant material such as hard rubber to the exterior end of which is connected a rubber or plastic tube 101, which is, in turn, connected into the main water line 79 through a pipe segment 102 of hard rubber or the like and a T connector 103. A valve 104 is provided in the main water line 79 ahead of the T connector 103.

The chlorine escape prevention unit 21 includes a tube 105 which extends through the bottom 24 into the water beneath the dome 14. The lower end of the tube 105 receives one end of a flexible tube 106, the other end of the latter engaging a pipe segment 107 extending into the throat of a small auxiliary Venturi tube 108. The inlet of the Venturi tube 108 is connected into the pipe segment 85 by a pipe segment 109 and to a drain (not shown) by a pipe 110. The Venturi tube 108 sucks a little water from beneath the dome 14 continuously when water is flowing in the main water line 79, and will likewise harmlessly draw off chlorine gas should the float valve assembly 16 leak during operation of the chlorinator 10.

Chlorine gas is supplied to the valve staff 28 from a standard chlorine gas cylinder 112 through suitable tubing 113, which is normally of silver, and through a filter (not shown). Details of the tubing 113 and the necessary connectors are not illustrated, since they form per se no part of the present invention. The same is true of the standard cylinder 112, which may be placed in a cabinet (not shown).

Operation

The chlorinator 10 is set up as is clearly shown in the drawings. The valve 86 is open and the valve 87 is adjusted so that adequate water flows to the receptacle 12. The valve 104 creates a pressure drop so that adequate water flows through the Venturi tube 90. The overflow tube 71 is adjusted to a position to allow the vacuum relief tube 67 to float when the water level under the dome rises higher than necessary to lift the float unit 42 off of the pin 38. It is to be understood, of course, that water passes back and forth beneath the glass dome 14 which is maintained in position on the bottom 24 of the receptacle 12 only by the clips 26. Water is continuously supplied through the tube 70 in order to maintain the desired levels exteriorly of the glass dome 14.

With water passing through the main water line 79 and being by-passed to the desired percentage of the auxiliary water line 78 through the Venturi tube 90 to operate the same, a vacuum will be established beneath the glass dome 14 above the water, originally trapped air being drawn out through the orifice 61, the suction tube 53, the tubing 57, and the check valve 94. Manifestly, the check valve 94 prevents water from being forced up into the suction tube 53 when the Venturi tube 90 is not operating. Water rises beneath the glass dome 14 until the force exerted on the pin 38 by the float unit 42 is insufficient to prevent the pin 38 from being lifted by the pressure of chlorine gas from the cylinder 112, it being understood that the valve of the chlorine cylinder 112 is open. Chlorine gas replaces air beneath the glass dome 14 and is, in turn, drawn out through the metering orifice 61 and through the suction tube 53 into the Venturi tube 90 where it enters the auxiliary water stream and passes with the water into the main water line 79 for passage to the point of application.

A balance of chlorine gas and vacuum is reached beneath the glass dome 14 so that the supply is adequate for the chlorinating purposes. Manifestly, if an excess of chlorine gas passes into the space beneath the glass dome 14 above the water, the water level will drop, which, in turn, drops the float 42 thereby closing the ball valve 40 against the valve seat 29, closing off the chlorine gas. The float valve assembly 16 remains closed until the vacuum is adequate to effect a rise of the water to a point again releasing the ball valve 40 from the valve seat 29.

As is mentioned above, the amount of chlorine gas delivered into the water main at the Venturi tube 90 is controlled by the size of the orifice 61 and the height of the suction tube 53 above the water level. This control is based, of course, upon a specified water flow through the main water line 79. The chlorine flow in pounds per day will remain constant as long as enough water flows through the Venturi tube 90 to operate it. Of course, if the flow through the main water line 79 changes, the concentration will change. Small adjustments are made by raising or lowering the suction tube 53, and large adjustments by changing the size of the metering orifice 61. It has been determined that for greatest metering accuracy, the orifice 61 should be small enough to allow the top of the suction tube 53 to be at least two inches above the water level in the glass dome 14. The slot 58 is provided in the tube 53 to insure a smoother action. Without the slot 58, water moving up the outside of the tube 53 will have enough momentum to momentarily cover the end thereof and cause throttling of the Venturi tube 90 with resulting drop of the water level in the tube 52. This does not occur with the slot 58 in the end of the tube 53.

The chlorinator 10 continues to function automatically to supply chlorine gas into the desired water line. If flow through the main line 79 stops, flow through the Venturi tube 90 stops. Any method to start and stop flow through the Venturi tube 90 will result in automatic operation. However, if the chlorine cylinder 112 becomes empty, manifestly, the water level under the glass dome 14 will rise due to the vacuum pull of the Venturi tube 90. Should the water level continue to rise unchecked, it would overflow the top of the valve staff 28 and be sucked back into the chlorine cylinder 112 which is highly objectionable since such seriously damages the cylinders 112. The vacuum relief float unit 20 prevents the water level from rising to an objectionable level by letting air beneath the glass dome 14 when the water level reaches a predetermined height. The tube 65 is open to atmosphere at all times, it being noted that the water level within the tube 67 is at the level of the water in the receptacle 12 exteriorly of the glass dome 14.

The function and operation of the chlorine escape prevention unit 21 is adequately described above in connection with the detailed description thereof.

A single chlorine discharge assembly 18 is illustrated in the drawings, but it is to be understood that several such assemblies may be mounted beneath the glass dome 14 and connected into individual Venturi tube units so that several tubes 101 would be employed to independently chlorinate the corresponding number of water supplies. Each water supply would receive chlorine only when water flows through the corresponding Venturi tube.

It is manifest that the present chlorinator 10 may be employed for chlorination of various types of water supplies. Only connections, valves, etc., need be changed for adapting the chlorinator 10 to any particular type of water supply. It is clear that the present chlorinator 10 fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a chlorinator including a water receptacle, a gas chamber, and means for exhausting chlorine gas from said gas chamber, of means for automatically admitting chlorine gas into said gas chamber including a hollow elongated member extending vertically into said gas chamber and being open at both ends, one end of said elongated member being adapted to be connected to a source of chlorine gas, a valve seat in said member, a valve member including a ball engaging said seat and a shaft extending above the upper end of said elongated member, and a float unit disengageably suspended from said shaft of the valve member having its center of gravity below the point of application of pressure to said shaft of the valve member, said float unit being sufficiently heavy to maintain said valve member in seated position against normal gas pressure upon predetermined drop in water level in said gas chamber.

2. In combination with a chlorinator including a water receptacle, a water trapped gas chamber, and means for introducing chlorine gas into said chamber from a source, of means for withdrawing chlorine gas from said chamber comprising a metering assembly and means for pulling a vacuum, said metering assembly including a first tube open at both ends extending upwardly in the gas chamber and a second tube surrounding said first tube, said second tube being open at the bottom to permit free entry of water between it and the first tube, and being closed at the top, said closed top of said second tube having a gas metering orifice therein of predetermined size, said first tube being in communication at its lower open end with said vacuum pulling means, said first tube having a slot in the wall extending downwardly from the open upper end thereof to effect smoother operation of said metering assembly.

3. A chlorinator comprising, in combination, a water-sealed chamber having a variable water level therein, means for selectively introducing chlorine gas from an appropriate pressurized source into said chamber above the normal maximum of said water level, said means comprising a conduit and a float valve assembly, and means in said float valve assembly for preventing an objectionable flow of water through said conduit upon the attainment of an abnormally high water level in said chamber due to substantial exhaustion of said pressurized source of chlorine gas, said float valve assembly comprising a tubular valve staff having a lower end connected to said conduit, a reduced passage in said valve staff intermediate the ends thereof, a seat at an upper end of said passage, an elongated valve pin adapted to cooperate with said seat for closing said passage, said valve pin being inserted in said valve staff and extending thereabove, and a float unit having an elongated recess for receiving said valve pin and a portion of said valve staff, said float unit being adapted to rest on an upper end of said valve pin.

4. A chlorinator comprising, in combination, a water-sealed chamber, means for introducing chlorine gas into said chamber, means for withdrawing chlorine gas from said chamber including a suction source and a discharge assembly, and means in said discharge assembly adapted progressively to throttle said suction source upon increase of suction beyond a predetermined value, said latter means including a pair of concentric tubes disposed vertically in said chamber, the outer of said tubes extending above the inner thereof and having an orifice above the top of the inner tube, said inner tube having a vertically elongated side opening whereby variation of a water level between predetermined limits causes water to be received into said tube at a rate commensurate with the height of said water level.

5. A chlorinator comprising, in combination, a water-sealed chamber having a variable water level therein, means for introducing chlorine gas into said chamber, means for withdrawing chlorine gas from said chamber including a suction source and a discharge assembly, and means in said discharge assembly adapted progressively to throttle said suction source upon increase of suction beyond a predetermined value, said latter means comprising a suction tube having an open upper end thereof disposed in said chamber at a predetermined elevation above the normal maximum of said water level therein, and a slot in the wall of said tube extending downwardly from said open upper end thereof, said slot having a vertical length substantially greater and a horizontal width substantially smaller than the diameter of said tube, whereby a rising water level on the outside of said tube may, upon reaching the lower end of said slot, flow into said tube at a rate substantially below the operative capacity thereof and whereby, upon a continued rise in said water level on the outside of said tube, the rate of flow of water thereinto will be progressively increased until the operative capacity of the tube is reached.

References Cited in the file of this patent

UNITED STATES PATENTS

| Number | Name | Date |
|---|---|---|
| 1,109,417 | Henkelman | Sept. 1, 1914 |
| 1,514,939 | Wallace | Nov. 11, 1924 |
| 1,777,986 | Wallace | Oct. 7, 1930 |
| 1,888,959 | Peet | Nov. 22, 1932 |
| 2,005,845 | Pardee | June 25, 1935 |
| 2,096,021 | Aherne | Oct. 19, 1937 |
| 2,137,204 | Booth | Nov. 15, 1938 |
| 2,189,427 | Long | Feb. 6, 1940 |
| 2,348,757 | Samiran | May 16, 1944 |
| 2,401,012 | Ornstein | May 28, 1946 |

FOREIGN PATENTS

| Number | Country | Date |
|---|---|---|
| 7,969 | Ausralia | June 24, 1932 |